United States Patent [19]

Ingre

[11] Patent Number: 4,550,483

[45] Date of Patent: Nov. 5, 1985

[54] METHOD OF MANUFACTURING A STRUCTURE WITH A FIXED AND A MOVABLE PART PROVIDED WITH OPTICAL FIBRES

[75] Inventor: Lars P. Ingre, Huddinge, Sweden

[73] Assignee: Telefonaktiebolaget LM Ericsson, Stockholm, Sweden

[21] Appl. No.: 502,693

[22] Filed: Jun. 9, 1983

[30] Foreign Application Priority Data

Jul. 1, 1982 [SE] Sweden ................................. 8204086

[51] Int. Cl.⁴ ............................................. B23P 17/00
[52] U.S. Cl. ........................................ 29/416; 29/425; 83/13; 83/701; 350/96.15
[58] Field of Search ................... 83/880, 13, 108, 701; 350/96.15; 29/622, 469.5, 425, 412, 416; 156/293

[56] References Cited

U.S. PATENT DOCUMENTS

| | | | |
|---|---|---|---|
| 4,043,026 | 8/1977 | Weidhaas et al. ................ | 29/416 X |
| 4,193,662 | 3/1980 | Hara ................................... | 350/96.15 |
| 4,220,396 | 9/1980 | Antell ................................ | 350/96.15 |
| 4,325,604 | 4/1982 | Witte ................................. | 350/96.15 |

FOREIGN PATENT DOCUMENTS

| | | | |
|---|---|---|---|
| 3012450 | 3/1980 | Fed. Rep. of Germany . | |
| 2479993 | 10/1981 | France ............................. | 350/96.15 |

Primary Examiner—James M. Meister
Assistant Examiner—John L. Knoble
Attorney, Agent, or Firm—Roberts, Spiecens & Cohen

[57] ABSTRACT

A method of manufacturing an optical fibre relay structure including fixed and movable parts provided with mutually parallel optical fibres. The fibres are fixed to a base plate in V-shaped grooves with the aid of gluing or bonding. The base plate and fibres are then parted by a cut at right angles to the axial direction of the fibres and to a planar edge surface of the base plate. There is thus obtained two mutually conforming parts respectively forming the fixed part and the movable part in the optical fibre relay.

3 Claims, 4 Drawing Figures

METHOD OF MANUFACTURING A STRUCTURE WITH A FIXED AND A MOVABLE PART PROVIDED WITH OPTICAL FIBRES

FIELD OF INVENTION

The present invention relates to a method of manufacturing a structure including a fixed and a movable part provided with optical fibres, to provide an optical switching function. Such a function is used in fibre-optical relays for switching between a first plurality of fibres and a second plurality of fibres.

BACKGROUND

In order to provide an optical switching function in an optical relay, optical fibres may be used which are mechanically moved in relation to each other so that light from an incoming fibre can be optionally switched to one of several alternative outgoing fibres. Several different solutions to such optical switching functions have been proposed such as shown, for example, in British Pat. No. 1,580,109 and in German Offenlegungsschrift No. 3,012,450.

The disadvantage of the prior is the magnitude of cost of handling the fibres in the provision of the switching function. The fibres must have their ends cut or ground flat and placed correctly within very narrow limits in relation to each other both axially and radially if optical attenuation is to be kept low.

SUMMARY OF INVENTION

An object of the present invention is to provide an improved method of manufacturing fixed and movable parts included in an optical-fibre switching structure of the kind mentioned above. The invention has as a primary application inclusion in a relay such as described in Swedish Patent Application No. 8204085-8.

A further object of the invention is to provide a method of manufacturing a relay wherein the handling of fibres is at a minimum during manufacture without spoiling the performance of the relay switching function.

In achieving the above and other objects of the invention, there is provided a method of manufacturing a structure which includes fixed and movable parts provided with optical fibres included in an optical fibre relay in which an optical switching function is performed by moving the movable parts from an aligned rest position and relative to the fixed part in a direction at right angles to the axial direction of the fibres to coupling position, said fibres being fixed in mutually parallel relation and with a given spacing on a common carrier, said method comprising separating the carrier and the fibres along a cut at right angles to the axial direction of the fibres to form the fixed part and the movable part such that mutually conforming fibre end surfaces are formed which are mutually opposing in said rest position. The orientation of the aforesaid parts is maintained after the cut such that when returning of the movable part to the rest position after movement to the coupling position the fibre end surfaces are again in mutually opposing relationship in substantially the same position.

In further accordance with the invention, the parting of the carrier and fibres in performed by cutting with a cutting tool. Moreover, a guide and an edge of the carrier are formed with corresponding shapes with the method further comprising displacing the edge of the movable parts from and against the guide to displace the fibres from and back to mutually opposing relationship.

BRIEF DESCRIPTION OF DRAWING

The invention will next be described in detail with reference to the accompanying drawing wherein.

BEST MODES FOR CARRYING OUT THE INVENTION

Figure 1:
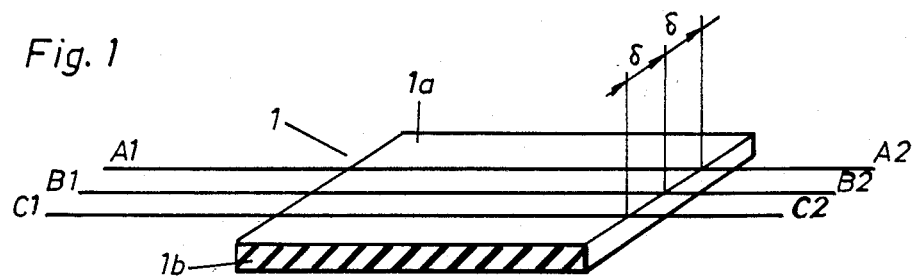
FIG. 1 is a perspective view of a base plate with optical fibres, forming the basic material in the method of manufacture according to the invention.
Figure 2:
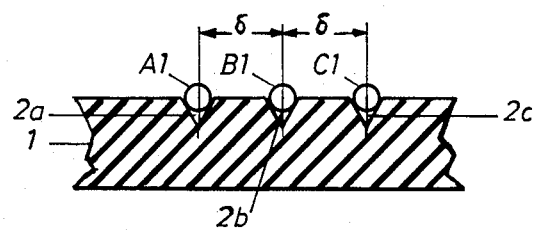
FIG. 2 is a cross section of the base plate and fibres according to FIG. 1.

In FIG. 1, a flat plate 1 forms the common base plate for carrier for three optical fibres A1-A2, B1-B2 and C1-C2. The plate 1 is suitably made from silicon and has a planar upper side 1a and at least one completely planar edge surface 1b. The fibres A1-A2, B1-B2 and C1-C2 are fixed in parallel to the upper side 1a with a given spacing. It will be seen from FIG. 2 that the fixation of the fibres can be carried out with the aid of three V-grooves 2a-2c. These grooves are conventionally formed by etching along the planar surface 1a in the axial direction of the fibres, with the use of a photographic imprint. The walls of the V-grooves form a given angle to the normal (about 35°) due to the crystallinic properties of the silicon material, a so-called AT section. The fibres A1-A2, B1-B2, and C1-C2 are then glued or otherwise bonded to the respective grooves. The positions of the fibres can also be fixed without grooves on the plate 1, with the aid of a precision tool for positioning the fibres during the adhering process.

Figure 3:
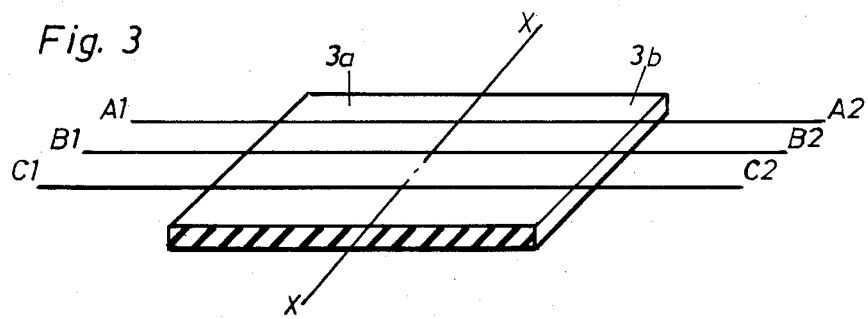
FIG. 3 is the same base plate with fibres according to FIG. 1 but cut according to the proposed method and, FIG. 4 is a perspective view of the fixed part and the movable part during aligning after parting has been carried out.

When the fibres have been fixed on the carrier plate 1, the plate and fibres are parted along a cut X—X as shown in FIG. 3. Parting can be accomplished with by a cutting tool, e.g. a power saw, the plate being parted so that the cut X—X is substantially at right angles to the planar edge surface 1b.

Two parts 3a and 3b are thus formed, with the fibre ends A1, B1 and C1 on part 3a and the fibre ends A2, B2 and C2 on part 3b, the end surfaces of the respective fibres conforming mutually.

Figure 4:
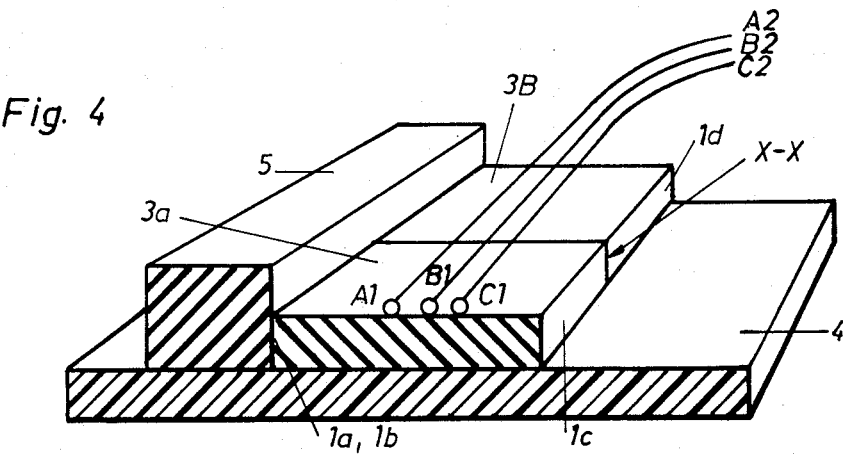

The switching function is obtained by placing the parts 3a and 3b with their undersides against a reference plane as illustrated in FIG. 4, so that they meet at the cut X—X according to FIG. 3. The parts 3a, 3b are oriented as they were before parting, the initially unparted fibres A1-A2, B1-B2 and C1-C2 being optically coupled. This initial situation is easy to provide with very small mechanical tolerances, which gives low optical attentuation at the junctions of the fibre ends. In FIG. 4, the initial position accoding to FIG. 3 has been provided with the air of a guide member 5 resting on the reference plane 4.

The part 3a may constitute the fixed part in a fibre optical relay according to the above-mentioned Swedish Patent Application and is firmly bonded to the substructure. In the relay the guide member is replaced by a piece of soft iron with one edge surface lying against the edge surface 1a of the fixed part 3a and also partly against the edge surface 1b of the movable part 3b.

Switching is obtained by displacing the movable part along the reference plane parallel to the cut X—X a distance equal to the fibre spacing δ from the initial position. For example, the connection B1-A2, C1-B2 may be obtained by switching. In the relay according to the above-mentioned Swedish Patent Application the actuation of the movable part 3b is obtained with a magnetically activated actuating arm.

Under the action of the actuating arm, the movable part 3b will be fixed in its position with the aid of a guide plate after switching. The edge surface 1d must then be completely planar, so that on its engagement against the guide plate the center lines of the fibre ends B1-A2 and C1-B2 (as described above) will coincide.

In the initial position, the end surfaces of the fibres A1-A2, B1-B2 and C1-C2 are in practically perfect mutual alignment and the attenuation across the switching point is very low. In the switching position according to the above, e.g. when the end surface of the fibre B1 is mated with the end surface of the fibre A2 a certain small deviation is impossible to avoid and the somewhat higher attenuation must possibly be compensated by an amplifier. After switching back to the initial position, the fibre end surfaces are once again practically perfectly aligned and attenuation is minimal. No compensating amplification is therefore necessary in the associated loop.

The low attenuation over the switching point enables passive bypass connection of a large number of nodes in cascade along a transmission path such as a loop, without the need of introducing repeaters.

What is claimed is:

1. A method of manufacturing a structure including fixed and movable parts provided with optical fibres included in an optical fibre relay in which an optical switching function is performed by moving the movable part from an aligned rest position and relative to the fixed part in a direction at right angles to the axial direction of the fibres to a coupling position, said fibres (A1-A2, B1-B2, C1-C2) being fixed in mutually parallel relation and with a given spacing (δ) on a common carrier (1), said method comprising separating the carrier and the fibres along a cut at right angles to the axial direction of the fibres to form the fixed part and the movable part (3a and 3b) such that mutually conforming fibre end surfaces are formed and mounting said parts for relative movement such that said end surfaces of said fibres are mutually opposing in said rest position after said cut, and upon a returning of the movable part to said rest position after the same has been moved to said coupling position, the fibre end surfaces are again in mutually opposing relation and in substantially the same position.

2. A method as claimed in claim 1, wherein the parting of the carrier and fibres is performed by cutting with a cutting tool.

3. A method as claimed in claim 1 wherein a guide and an edge of the carrier are formed with corresponding shapes, said method comprising displacing said edge of the movable part from and against said guide to displace the fibres from and back to mutually opposing relation.

* * * * *